United States Patent [19]

Wisotsky

[11] Patent Number: 4,797,862

[45] Date of Patent: Jan. 10, 1989

[54] SEISMIC GENERATOR

[75] Inventor: Serge S. Wisotsky, Tulsa, Okla.

[73] Assignee: Industrial Vehicles International, Inc., Tulsa, Okla.

[21] Appl. No.: 15,091

[22] Filed: Feb. 13, 1987

Related U.S. Application Data

[63] Continuation of Ser. No. 885,245, Jul. 14, 1986, abandoned, which is a continuation of Ser. No. 670,378, Nov. 9, 1984, abandoned.

[51] Int. Cl.$^4$ .............................................. H04R 1/02
[52] U.S. Cl. .................................... 367/143; 181/120; 181/121
[58] Field of Search .................. 181/110–121, 181/140, 142, 400–402; 367/17, 141, 142, 143, 144, 189, 190; 91/216 R, 216 A, 216 B, 217, 234, 402, 400; 92/117 A, 107, 117 R; 173/125, 134–138

[56] References Cited

U.S. PATENT DOCUMENTS

| | | | |
|---|---|---|---|
| T104,801 | 11/1984 | Rozychi | 181/119 |
| 2,882,685 | 4/1959 | Carlsen et al. | 91/402 X |
| 3,329,930 | 7/1967 | Cole et al. | 181/120 |
| 3,349,367 | 10/1967 | Wisotsky | 181/120 X |
| 3,365,019 | 1/1968 | Bays | 181/120 |
| 3,482,646 | 12/1969 | Brown et al. | 181/120 |
| 3,679,021 | 7/1972 | Goldberg | 367/143 |
| 3,745,885 | 7/1973 | Fair et al. | 91/216 |
| 4,020,744 | 5/1977 | Swenson | 91/216 B |
| 4,106,586 | 8/1978 | Stafford | 181/121 |
| 4,143,736 | 3/1979 | Fair | 181/119 |
| 4,147,228 | 4/1979 | Bouyouce | 181/121 |
| 4,265,331 | 5/1981 | Leonard | 181/119 |
| 4,506,758 | 3/1985 | Fair | 181/121 X |
| 4,516,230 | 5/1985 | Goodloe et al. | 367/190 |

Primary Examiner—Brian S. Steinberger
Attorney, Agent, or Firm—Kanz, Scherback & Timmons

[57] ABSTRACT

The method and apparatus for generating seismic vibrations in a liquid includes an electronically controlled, hydraulically powered generator that includes a piston assembly reciprocally mounted on a cylindrical post in a generator housing. The control apparatus includes a control valve that is located very close to the piston assembly thereby reducing the volume of the passageways extending to the piston assembly so that the cyclic rate of the piston assembly can be very rigid and can be changed accurately and quickly. An extended life is provided by releasing the high pressure fluid driving the piston assembly prior to impact between the piston assembly and the post and by providing a trapped volume of fluid in the chamber to damp the movement of the piston assembly toward the post.

14 Claims, 3 Drawing Sheets

4,797,862

SEISMIC GENERATOR

This is a continuation of application Ser. No. 06/885,245 filed July 14, 1986, now abandoned, which is a continuation of application Ser. No. 06/670,378 filed Nov. 8, 1984, now abandoned.

BACKGROUND OF THE INVENTION

1. Field of the Invention

This invention relates generally to improved method and apparatus for the generation of vibratory signals in liquid. More particularly, but not by way of limitation, this invention relates to an improved seismic generator apparatus and method that provides forore precise cyclic rate control and an extended operational life to the apparatus.

2. Description of the Prior Art

Various types of apparatus have been used in the past for generating the vibrations required for undersea exploration in seismic operations. For the most part, these devices provide some form of vibratory energy imparted into the water.

U.S. Pat. No. 3,349,367 issued Oct. 27, 1967 to Serge S. Wisotsky, contains a further discussion of the background and uses of such devices. The '367 patent also discloses a marine seismic generator that is similar to the generator disclosed herein. The apparatus of this invention is an improvement to the apparatus disclosed therein. While apparatus constructed in accordance with the '367 patent operated satisfactorily, apparatus constructed in accordance with the present invention is more efficient, provides more accurate control and response to changes of the cyclic rate.

Marine seismic generators are deployed from vessels and operate in conjunction with an array of electronic devices to receive the seismic signals. When operating, the devices are used many hours at a time because of the high costs involved. The generators must operate for literally millions of cycles without failures. Operating at 200 Hertz for 5 hours produces 3,600,000 cycles—and this is for only one five hour operating period. Thus, it is very important that the operating life of the generator be extended to the utmost.

The generator of this invnetion is also useful in generating vibratory signals in inland seismic operations when the generator is immersed in a pond, lake, mud pit or the like during operation. Such vibrations are sometimes utilized in connection with the vertical deployment of an array of geophones in a well bore or the like. The generator in such uses provides a point source of vibratory energy and the geophones sense the time occurrence and signal strength to provide geologists and geophysicist with information concerning the formations traversed and to be traversed by the well bore.

An object of the present invention is to provide improved apparatus for the generation of vibratory signals in liquid that has a longer operating life, is light, more compact, and provides for more accurate control of the cyclic rate of the vibratory signals.

SUMMARY OF THE INVENTION

Accordingly, this invention provides an improved seismic generator for creating vibratory signals in liquid comprising: a housing having a post protecting therefrom. A piston is mounted for reciprocating movement on the post and has a surface thereon that is arranged to engage the liquid. The piston includes an annular portion encircling the post. The annular portion and the post cooperate to provide a pair of expansible power chambers. First conduit or passageway means in said post provides pressurized fluid alternately to said chambers to cause reciprocation of the piston and to permit return flow of such fluid. Second conduit means is provided in the post for, at times, relieving the pressure in the chambers. A passageway in the piston connects the chambers with the second conduit mens when the piston is near the end of its travel.

In another aspect, this invention provides an improved method for causing seismic vibrations in liquid comprising the steps of: supplying a pressure fluid; directing the pressure fluid to a first expansible chamber to cause movement of a piston assembly in one direction; trapping fluid in the damping portion of a second expansible chamber to reduce the speed of movement of the piston assembly; directing the pressure fluid to the second expansible chamber to cause the piston assembly to move in the opposite direction; and, trapping fluid in the damping portion of the first expansible chamber to reduce the speed of movement of the piston assembly in the opposite direction.

BRIEF DISCUSSION OF DRAWINGS

The foregoing and additional objects and advantages of the invention will become more apparant as the following detailed description is read in conjunction with the accompanying drawing, wherein like reference characters denote like parts in all views and wherein.

BRIEF DESCRIPTION OF THE PREFERRED EMBODIMENT

Figure 1:
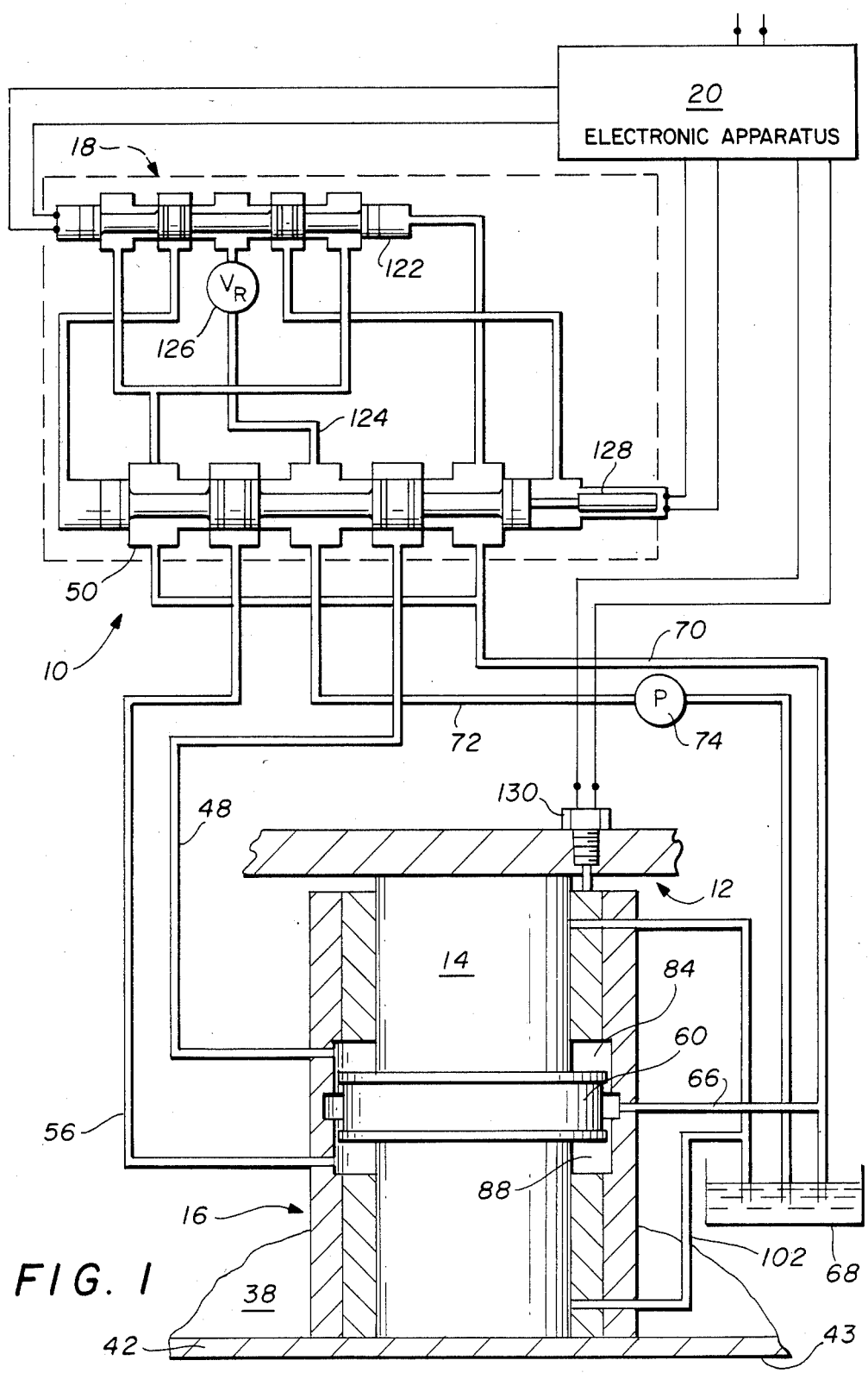
FIG. 1 is a schematic view of a seismic generator that is constructed in accordance with the invention.
Figure 2:
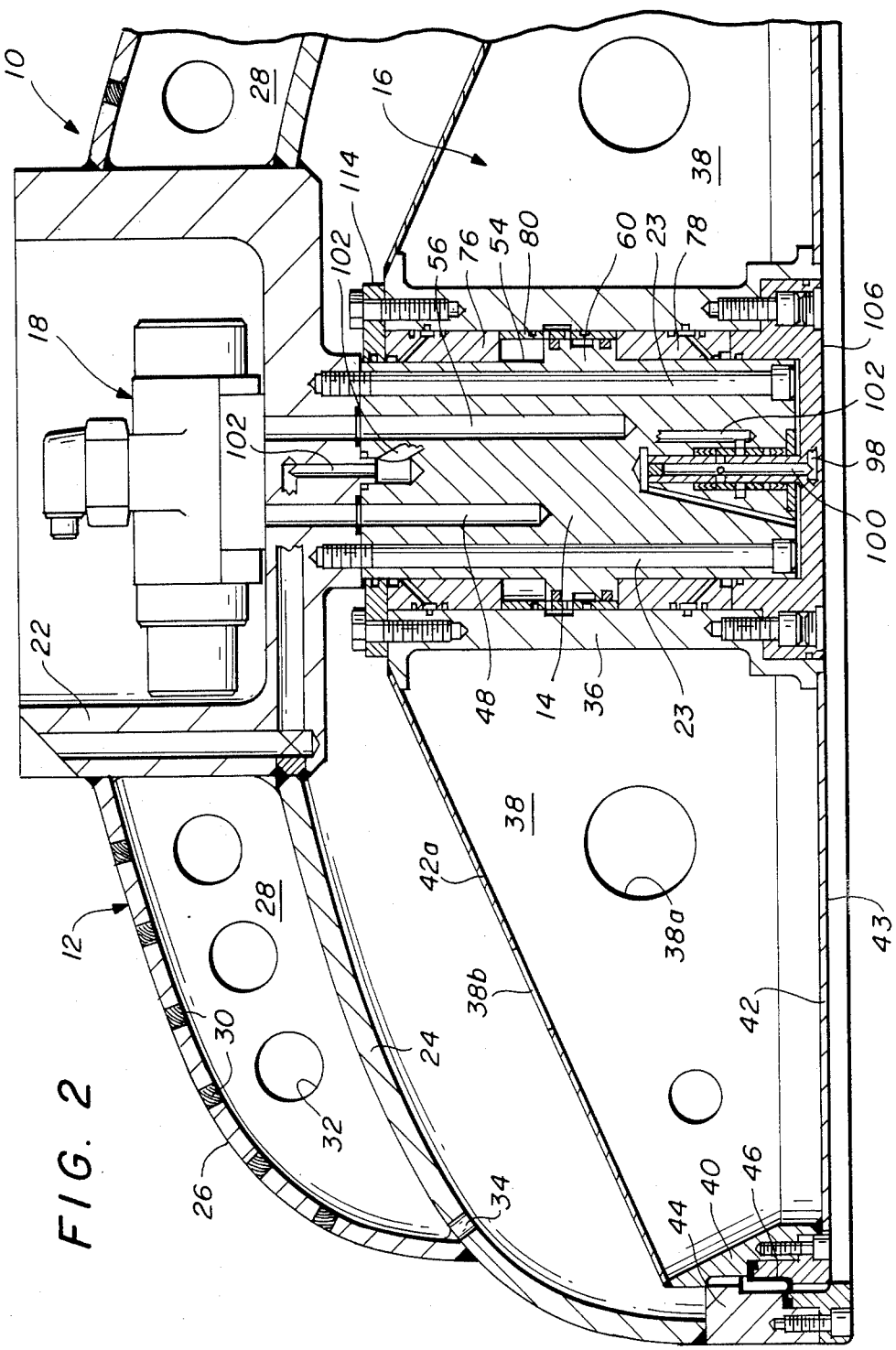
FIG. 2 is a partial cross-sectional view of the generator in FIG. 1 illustrating the structure thereof in more detail.

Referring to the drawing, and to FIGS. 1 and 2 in particular, shown therein and generally designated by the reference character 10, is a seismic generator that is constructed in accordance with the invention. The generator 10 includes a housing assembly 12 having a post assembly 14 projecting generally downwardly therefrom and a piston assembly 16 that is arranged, with respect to the post assembly 14, for reciprocating motion therebetween.

As shown in elevation in FIG. 2 and schematically in FIG. 1, the generator 10 also includes a control valve assembly 18. The control valve assembly 18 operates in conjunction with electronic apparatus 20, for causing reciprocation of the piston assembly 16 relative to the post assembly 14, and for controlling the cyclic rate of such reciprocating movement.

The housing assembly 12, as can be seen more clearly in FIG. 2, includes a cup shaped member 22 that is arranged to receive the control valve 18 and to which the post assembly 14 is secured by fasteners 23; a lower bell housing 24 that is sized to receive the piston assembly 16; and, an upper bell housing 26 that is welded to the cup shaped member 22 and to the lower bell housing 24. The upper bell housing 26 includes a plurality of circumferentially spaced, radially projecting reinforcing members 28 that extend between the upper bell housing 26 and lower bell housing 24. The housing 26 is welded to the members 28 by a plurality of plug welds 30.

It will be noted that each of the reinforcing members 28 is provided with a pluralty of openings 32 to permit fluid communication throughout the upper bell housing 26. Also, adjacent to the juncture between the upper bell housing 26 and lower bell housing 24, there is provided a plurality of vent holes 34 (only one hole 34 is shown in FIG. 2) that permit movement of gaseous fluid between the interior of the upper bell housing 26 and the interior of the lower bell housing 24.

The cup shaped member 22, the lower bell housing 24, and the upper bell housing 26 are designed and constructed so that the housing assembly 12 has a natural frequency that is outside of the operating frequency of the piston assembly 16. Accordingly, reciprocation of the piston assembly 16 will have no deleterious effect upon the structure of the housing assembly 12 since no harmful resonant frequencies will be generated.

The piston assembly 16 includes an annular portion 36 having plurality of circumferentially spaced reinforcing members 38 that project radially from said annular portion 36. Each member 38 has a plurality of openings 38a to provide communication throughout the pistbn 16. The reinforcing members 38 carry an annula peripheral member 40 and are attached at the lower ends thereof to a liquid engaging member 42 having a substantially planar lower surface 43. The members 38 are attached at their upper ends to contiguous reinforcing members 42a each of which is provided with vent holes 38b that permit co-unication between the interior of piston 16 and the davity in the lower bell housing 24. It will be noted that the annular peripheral member 40 is disposed in juxtaposition with an annular member 44 that is attached to the lower end of the lower-bell housing 24.

Disposed between the annular member 40 and the peripheral annular member 44 is a rolling seal 46 that has one end attached to the annular periheral member 40 and the other end attached to the annular member 44. The seal 46 is arranged to permit reciprocation of the piston assembly 16 relative to the annular member 44 on the housing 12 while maintaining a watertight seal therebetween.

Figure 3:
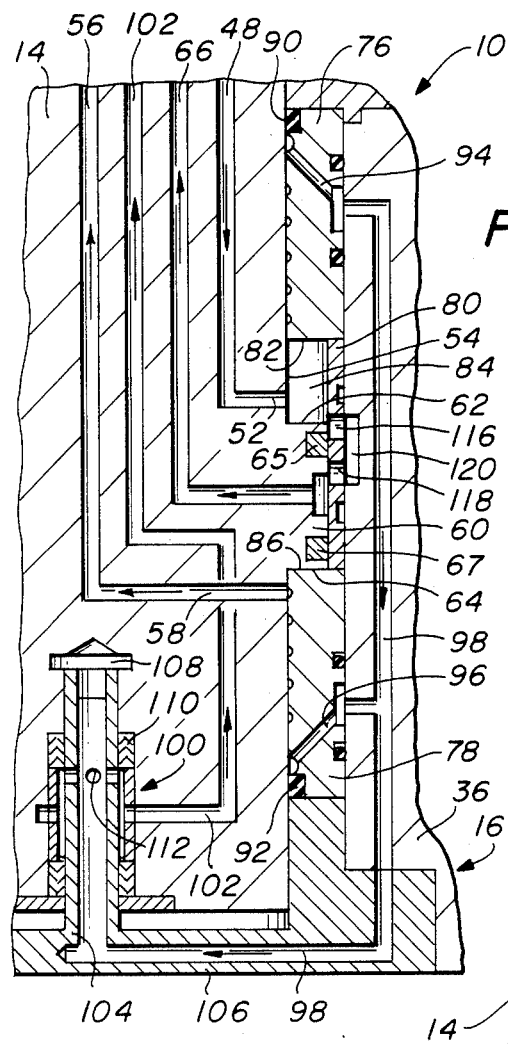
FIG. 3 is an enlarged fragmentary, cross-sectional view illustrating, somewhat schematically, the operational relationship between the piston and post contained in the generator of FIG. 1.
Figure 4:
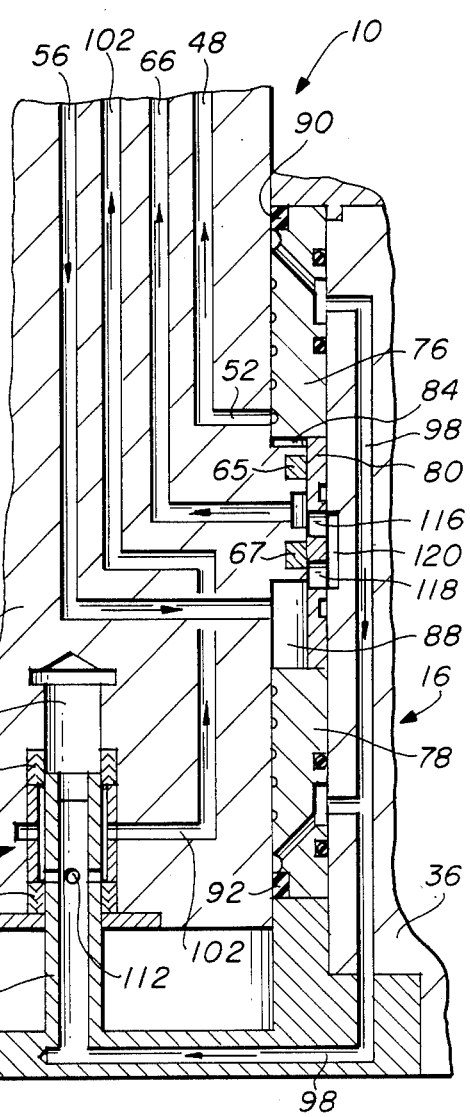
FIG. 4 is a view similar to FIG. 3, but illustrating the post and piston in another operating position.

FIG. 2 illustrates in detail the structure of the annular portion 36 of the piston assembly 16 and of the post assembly 14. Because of the complexity of the arrangement of the conduits, that is, the ports and passageways in the post assembly 14 and in the annular portion 36, such flow passageways are schematically illustrated in FIGS. 3 and 4. The flow passageways are also illustrated schematically in FIG. 1 in connection with a schematic illustration of the control valve assembly 18. The same reference characters will be used whether the various components are illustrated structurally or schematically.

A first power passageway 48 is formed in the post assembly 14 and has the upstream end of thereof connected with a power valve 50 which forms a part of the control valve assembly 18. The downstream end 52 of the first power passageway 48 extends through a sidewall 54 of the post assembly 14.

A second power passageway 56 extends through the post assembly 14 and has its upstream end also connected with the power valve 50. The lower or downstream end 58 of the second power passageway 56 extends through the sidewall 54 of the post assembly 14 in spaced relation to the end 52 of the first passageway 48.

While the passageways 48 and 56 have been described as power passageways, it should be understood that, depending upon the position of the power valve 50, one of the passageways 48 and 56 functions as a power passageway while the other functions as a return passageway. Upon movement of the oower valve 50 to another position, the roles of the passageways 48 and 56 are reversed to cause reciprocation of the piston assembly 16, as will be described.

The post assembly 14 also includes a radially projecing annular flange 60 that provides an upwardly facing surface 62 and a downwardly facing surface 64. Disposed between such surfaces 62 and 64 and extending though the peripheral surface of the flange 60 is a relief passageway 66. Localed belween the surfaces 62 and 64 are a pair of spaced annular seals 65 and 67. The seals are positioned on each side of the passageway 66. The relief passageway 66 is connected to a fluid reservoir 68 as is schematically illustrated in FIG. 1.

Also connected to the reservoir 68 is a return passageway system 70 that is connected to the power valve 50. The system 70 connects the appropriate power passageway 48 or 56 by means of the power valve 50 to return said fluid from valve 50 to the reservoir 68 from the appropriate passageway 48 or 56.

High pressure fluid is supplied to the power valve 50 through a conduit 72 which has a hydraulic pump 74 located therein. Depending upon the position of the power valve 50 fluid from the pump 74 flows through the conduit 72 into the appropriate power passageway 48 or 56.

Reverting again to FIGS. 2 and 3, the piston assembly 16 includes an upper bearing 76 that is attached to and moves with the piston assembly 16 and a lower bearing 78 that also moves with the piston assembly 16. Spacer member 80 located between the bearing 76 and 78 to hold the bearings in the desired spaced relation.

The post assembly 14 and the piston assembly 16 cooperate to provide first and second expansible power chambers 84 and 89. More particularly the upper bearing 76 provides a downwardly facing surface first abutment 82 which, in conjunction with the upwardly facing surface 62 on the flange 60, the spacer member 80 and th sidewall 54, form first expansible power chamber 84. Similarly, the lower bearing 78 provides an upwardly facing surface or second abutment 86 that, in conjunction with the sidewall 54, the spacer member 80, and the downwardly facing surface 64 on the flange 60 form a second expansible power chamber 88 (see FIG. 4). Seals 65 and 67 (FIGS. 3 & 4) engage spacer member 80 to seal the hydraulic fluid within the power chambers 84 and 88.

An upper main seal 90 and a lower main seal 92 are carried by the bearings 76 and 78, respectively, and are located between the piston assembly 16 ad the post assembly 14. To extend the operating life of the generator 10, the seals 90 and 92 are protected from the impositionof extremely high pressures generated during reciprocation of the piston assembly 16 by the presence of drain or relief passageways 94 and 96. Each passageway 94 and 96 extends through its associate bearing, namely bearings 76 and 78 respectively, to provide fluid communication from the contact area between bearings 76 and 78 and the post assembly to a drain passageway 98. As can be seen, the drain passageway 98 is routed through a sliding connection 100 to connect to a passageway 102.

As may be seen more clearly in FIG. 3 and 4, the sliding connection 100 includes a tubular member 104 that projects upwardly from a base cap 106 (see FIG. 2) into a cavity 108 that is formed in the post assembly 14. Within the cavity 108, there is located an upper and lower seal 110 that provides a fluid tight seal between the tubular member 104 and the post assembly 14.

The member 104 includes a plurality of ports 112 that provide communication between the drain passageway 98 and the drain passageway 102. The purpose of the sliding seal assembly 100 is to prevent any possibility of the reciprcation between the piston assembly 16 and the post assembly 14 causing "pumping" of fluid contained in the passageway 98.

As illustrated in FIG. 2, the various components of the annular portion 36 of the piston assembly 16 are trapped between a bottom cap 106 and a top cap 114. The caps 106 and 114 are attached to the annular portion 36 by threaded fasteners and retai the upper and lower bearings 76 and 78 and the spacer member 80 in the relationship illustrated. They also function indirectly to prevent movement of the piston assembly 16 off of the post assembly 14 during reciprocation.

To further protect the generator 10 from damage, and thus, to prolong the life thereof, it will be noted that the downstream ends 52 and 58 of the power passageways 48 and 56, respectively, connect into the chambers 84 and 88, respectively, at locations slightly above and below the surfaces 62 and 64 on the flange 60. Thus, as the chambers 84 and 88 collapse, as illustraeed by the chamber 84 in FIG. 4, a small damping chamber is formed therein in which fluid is trapped and thus dampens the movement of the piston assembly 16 relative to the post assembly 14. The fluid trapped therein is discharged by way of a restricted leakage passageway defined by the bearing 76 or 78, as is appropriate, from whence it is discharged through the drain passageway 98.

As a further measure to prolong the life of the generator 10 by avoiding physical damage to the various components, the spacer member 80, is provided with two vertically spaced rows of ports 116 and 118 that are also circumferentially spaced. Communication between the rows of ports 116 and 118 is provided by an annular space or recess 120 formed in the annular portion 36. As the piston assembly 16 moves relative to the post assembly 14, the rows of ports 116 or 118 are moved into communication with the chamber 84 or 88 prior to the time that the surface 82 impacts the surface 62 or the surface 86 impacts the surface 64 to permit the high pressure fluid flowing through the pressure supply passageway 48 or 56 to flow into the relief passageway 66. Thus, the force moving the piston assembly 16 is relieved so that full pressure load is not applied to drive the piston assembly 16 into the post assembly 14.

It was previously mentioned that the generator 10 is more responsive and more accurate in its cyclic control of the frequency of operation. This is due to the construction of the cup shaped member 22 which permits the control valve assembly 18 to be located very close to the piston assembly 16.

As shown in FIG. 2, the power passageways 48 and 56 are very short and rlatively small, and thus contain a very small amount of hydraulic fluid. Since the compliance of hydraulic fluid is relatively high, the quantity of oil in the power passageways 48 and 56 can limit the upper frequency response of the generator. Accordingly, pressure can be quickly applied and quickly released since a small volume of fluid is involved and thus very quick response to cyclic rate changes can be made and a fast cyclic rate (e.g. 250 Hertz) can be attained.

Further, to control the accuracy in response of the generator 10, there is provided a pilot valve 122 which receives pressurized fluid from the power valve 50 through a passageway 124. In the passageway 124 is a regulator 126 that modulates the pressure required to shift the position of the pilot valve 122. The regulator 126 is responsive to the electronic system 20 and shifts the pilot valve 122 to the desired position to control the cyclic rate of the generator 10.

The control valve assembly 18, including the valves 50, 122 and the regulator 126, has not been described in detail because they are purchased items. One satisfactory control valve is manufactured by MOOG, Inc. of East Aurora, N.Y. 14052.

The electronic system 20 receives signals from the opeator of the generator 10 and from a linear variable differential transformer 128 that is moving with the power valve 50 so that the position of the power valve 50 is transmitted to the electronic system 20. A second linear variable differential transformer 130 is located in the housing 12 and extends into contact with the piston assembly 16 so that the position of the piston assembly 16 is also transmitted to the electronic assembly 20.

Accordingly, the input to the electronic system 20 of the desired cyclic rate by the operator is applied through the pilot valve 122 and the power valve 50 to the piston assembly 16 through the post 14 assembly to obtain the desired cyclic rate. As previously mentioned in connection with the description of FIG. 2, the power passageways are relatively small and relatively short so that a very small volume of hydraulic fluid is involved in the reciprocation of the piston assembly 16 and the cyclic rate can be efficiently and accurately controlled nd changes thereto can be made quickly.

OPERATION OF THE PREFERRED EMBODIME

In operation, it will be understood that the generator is immersed in liquid, that the electronic assembly 20 has been provided with cyclic rate data, and that pressurized hydraulic fluid is being supplied by the pump 74 into the control valve assembly 18, that is, into the power valve 50 and into the pilot valve 122. Depending upon the position of the power valve 50 (assume for example, that fluid is being supplied through the power passageway 48 as shown in FIG. 3), the piston assembly 16 is driven upwardly as the fluid enters the expansible power chamber 84. If for any unforseen reason, the piston assembly 16 overtraels and nears the upper end of its travel and before he surface 64 impacts the surface 86, the ports 116 move into communication with the chamber 84. Fluid flows from the chamber 84 through the annular space 120 and through the ports 118 into the return passageway 66, thus diminishing the power driving the piston 16 upwardly. Also, and as previously pointed out, the location of the outlet 58 of the power port 56 in the chamber 88 results in a small volume of fluid being trapped between the surface 64 and the surface 86, thus damping the movement of the piston assembly 16 toward the post assembly 14 and preventing impact therebetween, which could damage the post assembly 16 or the surface 64 on the bearing 78.

At this point, the high pressure generated by fluid being trapped in the damping chamber and dissapated along the bearing 78 is not exerted upon the lower main seal 92 due to the presence of the drain passageway 96 and 98, which is ultimately connected to the return passageway 102 and thereby to the reservoir 68.

As the piston assembly 16 travels upwardly, the linear variable differential transformer 130 (FIG. 1) signals the electronics apparatus 20 the position of the piston assembly 16. When the piston assembly 16 reaches the upper end of its travel, the pilot valve 122 is shifted, causing shifting of the power valve 50 which in turn reverses the roles of the passageways 48 and 56. That is, the passageway 56 now becomes the supply passageway for the pressure fluid which enters into the expansible power chamber 88, moving the piston assembly 16 toward its lowermost position as illustrated in FIG. 4 and the passageway 48 serves to return fluid from the chamber 84.

As the piston assembly 16 moves downwardly, the chamber 88 is brought into communication with the relief pasageway 66 through the lower ports 118, the annular space 120, and the upper ports 116. Thus, and as previously pointed out, the power driving the piston assembly 16 downwardly is substantially reduced. Simultaneously, a small portion of fluid is trapped in the power chamber 84 due to the location of the exit 52 of the passageway 48. As was previously mentioned, the fluid pressure that is generated therein that damps the downward movement of the piston assembly 16 is not imposed upon the upper seal 90 since such fluid pressure is vented outwardly thoough the drain passageway 98.

The foregoing detailed description sets forth a marine seismic generator that is quickly and easily changed from one cyclic rate to the other, one in which the cyclic rate is accurately and easily controlled, and one having an extended service life. As mentioned in detail, the extended service life results from the release of the fluid pressure from the power chambers so that the force driving the piston assembly stops prior to impact with the post assembly; the use of a small trapped volume for damping the movement of the piston assembly; and the relief protection provided to the main seals so that the high fluid pressure is not exerted thereacross. Accuracy and rapidity of cyclic control and reciprocation is accomplished by positioning the control valve assembly very close to the piston assembly 16 so that the passageways supplying the hydraulic fluid to cause reciprocation are small in volume.

It will be understood that the foregoing detailed description is provided by way of example only, and that many changes and modifications can be made threto without departing from the spirit or scope of the invention as set forth in the annexed claims.

What is claimed is:

1. A seismic generator for creating vibratory signals in liquid comprising in combination:
    a housing assembly including a post assembly projecting centrally therefrom, said post assembly having a sidewall, first and second power passageways therein extending through said sidewall and a relief passageway extending through said sidewall between said first and second power passageways;
    a piston assembly mounted for reciprocating travel on said post assembly and having a surface thereon arranged to egage the liquid, said piston assembly encircling said post assembly and including means for providing fluid communication between said first power passageway and said relief passageway and between said second power passageway and said relief passageway, respectively, before said piston assembly has reached each end of its travel;
    said piston assembly and said post assembly cooperating to provide an expansible first power chamber and an expansible second power chamber communicating, respectively with said first and second power passageways to enable relative reciprocating travel between said piston asssembly and said post assembly;
    valve means connected with said passageways and for connection to a source of pressurized fluid; and
    control means responsive to the relative position of said post assembly and said piston assembly for controlling said valve means to direct pressurized fluid to an appropriate one of said power passageways to cause reciprocation of said piston assembly for production of vibratory signals in the liquid.

2. The seismic generator of claim 1 wherein said means for providing fluid communication includes means having first and second rows of circumferentially spaced ports in fluid communication with each other and upon relative movement between said post assembly and said piston assembly alternately provides fluid communication between said relief passageway and said first and second power chambers prior to said piston assembly having reached each end of its travel.

3. The seismic generator of claim 1 including a plurality of circumferentially spaced reinforcing members extending radially from said piston assembly and attached to said liquid engaging surface of said piston assembly.

4. The seismic generastor of claim 1 wherein:
    said piston assembly having an annular recess formed in an interior surface thereon directed toward said post assembly, bounded by oppositely facing first and second abutments;
    said post assembly including an annular flange extending between said abutments and having first and second abutments respectively, sai siewall, abutments, and first ad secon surfaces comprising elements defining said expansible power chambers; and,
    said first and second power passageways terminating in said power chambers adjacent to and spaced from said first and second abutments, respectively, forming a damper portion in each power chamber for alleviating impact between said abutments and surfaces to avoid amage to sai generator in the event of over-travel of sai piston assembly.

5. The seismic generator of claim 4 in which said piston assembly includes an annular portion having a drain passageway, said post assembly and piston assembly defining restricted leakage passageways connected at one end to said damper portions, and means in said piston assembly connecting an opposite end of asid leakage passageways with said drain passageway.

6. The seismic generator of claim 5 in which said piston assembly includes first and second annular bearing members located adjacent to and in contact with side walls of said post assembly, ends of said bearing members providing said abutments, said restricted leakage passageways extending along the contact between said sidewalls and said first and second annular bearings.

7. The seismic generator of claim 6 in which said piston assembly includes
    seal means adjacent to each end of said piston assembly in sliding relation to said post assembly; and said means connecting an opposite end of said leakage passageway is provided by a relief passageway extending through each said bearing member and spaced from said power chambers to provide fluid counication to said drain passageway and thereby avoid an imposition of pressure by said pressurized fluid upon said seal means.

8. The seismic generator of claim 5 in which said post assembly includes a second drain passageway, and means connecting said second drain passageway to said drain passageway in said annular portion.

9. The seismic generator of claim 8 in which said means connecting said drain passageways comprises a tubular member extending upwardly from said piston assembly into a cavity formed in said post assembly.

10. A method for causing seismic vibrations in a liquid by causing reciprocating movement of a piston assembly along a fixed post assembly to effect movement in the liquid of a plate member fixed to the piston assembly comprising the steps of:

directing pressurized fluid by way of the post assembly to a first expansible chamber to cause movement of the piston assembly in one direction;

directing the pressurized fluid to a relief passageway in the post assembly before said piston assembly has reached the end of its movement to reduce the force applied to said piston assembly by said pressurized fluid;

trapping fluid in a damping portion of a second expansible chamber to reduce the speed of movement of said piston assembly;

directing pressurized fluid by way of the post assembly to said second expansible chamber to cause said piston assembly to move in the opposite direction;

directing said pressurized fluid to said relief passageway before the piston assembly has reached another end of its movement to reduce the force applied to said piston assembly by said pressurized fluid; and trapping a portion of the pressurized fluid in a damping portion of said first expansible chamber to reduce the speed of movement of said piston assembly in the opposite direction.

11. The method of claim 10 including the step of bleeding the pressurized fluid from said damping portion of each said chamber slowly into a lower pressure passageway.

12. A seismic generator for creating vibratory signals in liquid comprising in combination:

a housing assembly including a post assembly projecting therefrom;

a piston assembly including a spacer member and an annular portion located for reciprocating travel on said post assembly, said piston assembly, said spacer member and said post assembly efining a pair of expansible power chambers therebetween;

first and second conduit means in said post assembly for alternately providing pressurized fluid to one of said power chambers and removing pressurized fluid from the other of said power chambers to cause reciprocation of said piston assembly beteen tow spaced end positions;

a third conduit means in said post assembly; and, passageay means in said piston assembly and said spacer member for connecting said power chambers with said third conduit means when said piston assembly approaches an end of its reciprocating travel near to each of said end positions to issipate the force generated by said pressurized fluid driving said piston assembly.

13. The generator of claim 12 wherein said first and second conduit means each includes a downstream end connected into said power chambers and located in position spaced from the end of travel of said piston assembly to be alternately opened and closed by movement of said piston assembly whereby a portion of said fluid is substantially trapped between said piston assembly and said post assembly as said piston assembly alternately approaches near to each of said end positions to dampen the movement of said piston assembly relative to said post assembly.

14. A method for causing seismic vibrations in liquid by causing a reciprocating travel of a piston assembly along a fixed post assembly to effect movement in the liquid of a plate member fixed to the piston assembly comprising the steps of:

directing pressurized fluid by way of the post assembly to a first expansible chamber to cause travel of the piston assembly in one direction;

connecting the first chamber to a relief passageway in the post assembly to relieve the pressure in said first chaber as said piston assembly nears an end of its travel;

directing pressurized fluid by way of the post assembly to a second expansible chamber to cause the piston assembly to travel in an opposite direction; and, connecting the second expansible chamber to the relief passageway in the post assembly to relieve the pressure in the second expansible chamber as the piston assembly nears an opposite end of its travel.

* * * * *